United States Patent Office 3,083,196
Patented Mar. 26, 1963

3,083,196
5α-METHYL-STEROID-3-ONES
John Fried, Fords, Anthony N. Nutile, Elizabeth, and Glen E. Arth, Cranford, N.J., assignors to Merck & Co., Inc., Rahway, N.J., a corporation of New Jersey
No Drawing. Filed Feb. 19, 1960, Ser. No. 9,696
11 Claims. (Cl. 260—239.5)

This invention is concerned generally with novel steroid compounds and with processes for preparing the same. More particularly, it relates to 5α-methyl-steroid-3-ones and to the novel process of preparing these compounds starting with a Δ⁴-steroid-3-one.

In accordance with the present invention, the Δ⁴-steroid-3-one, in which any reactive groups present at C–17, or in any side chains attached at the C–17 position of the steroid molecule, are first protected with suitable protecting groups, is first converted into the corresponding steroid-3,6-dione. It is convenient to bring about this conversion by bromination of the Δ⁴-steroid-3-one, using a reagent such as N-bromo-succinimide, to form the 6-bromo-derivative, and then to treat the 6-bromo-steroid-3-one with an acidic reagent, for example, concentrated hydrochloric acid, to form the steroid-3,6-dione. If the acid treatment has resulted in the simultaneous removal of any protecting group, it is desirable to again protect such reactive group before proceeding with the next step. For example, a Δ⁴-androstene-17β-ol-3-one acetate will be transformed into the Δ⁴-androstene-17β-ol-3,6-dione, which is then conveniently treated with an acylating reagent in order to form the androstane-17β-ol-3,6-dione acylate before proceeding with the next step. The acyloxy groups that are employed in these reactions include the benzoate esters, and the lower alkanoates such as acetoxy and propionoxy.

The steroid-3,6-dione is then transformed into the 3,3-dimethoxy-steroid-6-one by heating with selenium dioxide and methanol for several hours, and the 3,3-dimethoxy-steroid-6-one so obtained is heated under suitable conditions in order to form the 3-methoxy-Δ²-steroid-6-one.

The 5α-methyl group is introduced into the steroid molecule by methylating the 3-methoxy-Δ²-steroid-6-one to give the 5α-methyl-3-methoxy-Δ²-steroid-6-one.

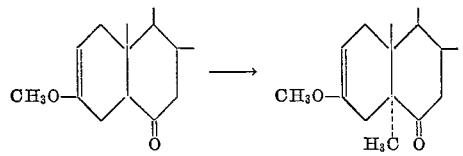

In a preferred embodiment of our invention, the methylation reaction is carried out by reaction of the 3-methoxy-Δ²-steroid-6-one first with sodium hydride, which forms the corresponding enolate, and then with methyl iodide to give the corresponding 5α-methyl-3-methoxy-Δ²-steroid-6-one. For example, in order to methylate the 3-methoxy-Δ²-steroid-6-one to form the 5α-methyl derivative a solution of the steroid compound in a solvent, such as xylene is dried and cooled. To this solution is added a dispersion of sodium hydride in a solvent, together with a very small amount of a tertiary alcohol, such as tertiary-butanol, and the mixture is then heated in an inert atmosphere in order to convert the 6-keto-steroid into the corresponding enolate form. After cooling, dry methyl iodide is added in about a 20% excess of the theoretical amount. Excessive quantities of methyl iodide should not be used so as to avoid side reactions, such as possible methylation also at the 7-position of the steroid ring. The methylation reaction is conveniently carried out by refluxing over-night. The 5α-methylated steroid is ordinarily the only monomethylated component present, as shown by chromatographic separation of the crude product. The reaction can, therefore, be considered stereospecific.

Analytical data of the methylated products indicate that the 5-methyl derivative formed on methylation of a 3-methoxy-Δ²-steroid-6-one is the 5α-methyl derivative. Based on theoretical considerations, the steric consequences of the methylation of the steroid molecule appears to be dependent upon the geometry of the transition state involved. However, it is not desired to limit the present invention to any particular theory of action.

The process of forming the 5α-methyl derivatives of the steroid-3-ones is not limited to any particular type of steroid compounds, but is an effective procedure for steroid compounds generally, and includes especially steroids of the androstane and pregnane series, provided that any reactive groups present at C–17, or in a side chain attached to the C–17 position of the steroid molecule, are first protected by suitable protecting groups.

The 5α-methyl-3-methoxy-Δ²-steroid-6-ones are converted into the 5α-methyl-steroid-3-ones by first eliminating the 6-keto group, suitably by reaction with hydrazine and potassium hydroxide, and then hydrolyzing the resulting 5α-methyl-3-methoxy-Δ²-steroid by the use of an acidic reagent such as p-toluene sulfonic acid.

The 5α-methyl-steroid-3-one may be reduced to the corresponding 3α-hydroxy-derivative by means of sodium borohydride in a solvent such as tetrahydrofuran, or to the corresponding 3β-hydroxy-derivative by catalytic reduction with a heavy metal catalyst, for example, PtO₂.

The 5α-methyl-Δ¹-steroid-3-ones may be obtained by brominating the corresponding 5α-methyl-steroid-3-ones under suitable conditions, for example with bromine in a solution of p-toluene-sulfonic acid, acetic acid and sodium acetate, and then heating the resulting bromo-compound with lithium chloride in the presence of dimethylformamide.

Following the procedure set forth above, 5α-methyl-androstane-17β-ol-3-one is prepared by the following steps: Androstane-17β-ol-3,6-dione is reacted with an acylating agent, for example, benzoyl chloride to form androstane-17β-ol-3,6-dione benzoate, which compound is then transformed into 3,3-dimethoxy-androstane-17β-ol-6-one-benzoate by heating with selenium dioxide and methanol. The 3,3-dimethoxy-androstane-17β-ol-6-one-benzoate so obtained is heated under suitable conditions to form 3 - methoxy - 2 - androstene-17β-ol-6-one-benzoate, which is methylated by reaction with sodium hydride and then with methyl iodide under controlled conditions to give 5α-methyl-3-methoxy-2-androstene-17β-ol-6-one benzoate. The 5α-methyl-3-methoxy-2-androstene-17β-ol-6-one benzoate is converted into 5α-methyl-androstane-17β-ol-3-one by first eliminating the 6-keto group, suitably by reaction with hydrazine and potassium hydroxide, and then hydrolyzing the resulting 5α-methyl-3-methoxy-2-androstene by the use of an acidic reagent such as p-toluene-sulfonic acid.

The 5α-methyl-androstane-17β-ol-3-one may be reduced to 5α-methyl-androstane-3α,17β-diol by means of sodium borohydride in a solvent such as tetrahydrofuran, or to 5α-methyl-androstane-3β,17β-diol by catalytic reduction using a PtO₂ catalyst.

The 5α-methyl-androstane-17β-ol-3-one may be converted into 5α-methyl-1-androstene17β-ol-3-one by brominating 5α-methyl-androstane-17β-ol-3-one under suitable conditions, for example, a solution of the steroid in p-toluenesulfonic acid is brominated at 20° C. with a solution containing bromine, acetic acid and sodium acetate. The resulting 6-bromo-compound is then heated with lithium chloride in the presence of dimethylformamide.

In addition to the aforementioned 5α-methyl-steroid-3-ones this invention contemplates the preparation of certain derivatives thereof, and in particular, the novel 5α-methyl-3-oxygenated-androstane-compounds which may be chemically represented by the following structural formula:

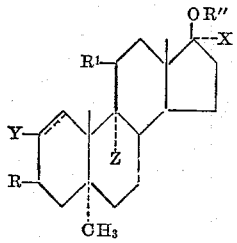

the 1,2-position of the steroid molecule being double bonded or saturated, and wherein R is a keto or hydroxy substituent, R' is hydrogen, or a keto or hydroxy substituent, R'' is hydrogen or an acyl radical, X stands for hydrogen, a lower alkyl, or a vinyl radical, Y is hydrogen or an α-fluoro, or α-methyl substituent and Z is hydrogen or an α-fluoro-, α-bromo-, or α-chloro-substituent.

The novel 5α-methyl-3-oxygenated-androstane compounds are characterized as possessing diminished androgenic activity. In addition, they possess great anabolic action and are thus of value in treating cases of cachexia, post-operative convalescence and burns.

In order to obtain the 5α-methyl-androstane-3-ones which are substituted in the 2-position it is preferable to first convert the 4-androstene-3-one into the corresponding 5α-methyl-androstane-3-one, and then to introduce the desired substituent in the 2-position.

The 5α-methyl-2α-fluoro-androstane-17β-ol-3-one is prepared by passing perchloryl fluoride through a solution of 5α-methyl-3-methoxy-2-androstene-17β-ol in a hydrocarbon solvent to which a small quantity of pyridine has been added.

The 2α,5α-dimethyl-androstane-17β-ol-3-one is prepared by treating the 5α-methyl-androstane-17β-ol-3-one sequentially with dimethyloxalate, methyl iodide and sodium methoxide.

The 5α-methyl-[3,2-C]pyrazolo-androstane-17β-ol-3-one is prepared by converting the 5α-methylandrostane-17β-ol-3-one first into the corresponding 2-hydroxymethylene-derivative by heating with sodium ethoxide in ethyl alcohol and ethyl formate, and then reacting the 2-hydroxymethylene derivative with anhydrous hydrazine to give the 5α-methyl-[3,2-C]pyrazolo-androstane-17β-ol-3-one.

The 17α-methyl derivatives of 5α-methyl-androstane-17β-ol-3-one are obtained by oxidizing the 5α-methyl-3-methoxy-2-androstene-17β-ol to the 5α-methyl-3-methoxy-2-androstene-17-one, and then reacting the latter compound with methyl magnesium iodide, followed by treatment with an acidic reagent, for example, p-toluenesulfonic acid.

The 17α-vinyl- and the 17α-ethyl derivatives of 5α-methyl-androstane-17β-ol-3-ones (i.e. the 5α-methyl-20-pregnene-17β-ol-3-one and the 5α-methyl-pregnane-17β-ol-3-one) are obtained by reacting the 5α-methyl-3-methoxy-2-androstene-17-one with acetylene to form the 5α-methyl-17α-ethynyl-3-methoxy-2-androstene-17β-ol, which is then hydrolyzed with an acidic reagent, for example, p-toluenesulfonic acid, to give the 5α-methyl-17α-ethynyl-2-androstene-17β-ol-3-one. The latter compound may be reduced to the 5α-methyl-17α-vinyl-2-androstene-17β-ol-3-one by use of the Lindlar catalyst, or to the 5α-methyl-17α-ethyl-2-androstene-17β-ol-3-one by use of a Pd/C catalyst.

The 5α-methyl-17α-lower alkyl-androstane-17β-ol-3-one is reduced to the corresponding 3α-hydroxy-derivative by means of sodium borohydride in a solvent such as tetrahydrofuran, or to the corresponding 3β-hydroxy-derivative by catalytic reduction using a PtO₂ catalyst.

The 5α-methyl-17α-lower alkyl-androstene-17β-ol-3-one is obtained by brominating the corresponding 5α-17α-dimethyl-androstane-17β-ol-3-one under suitable conditions, for example, a solution of the steroid in p-toluenesulfonic acid is brominated at 20° C., with a solution containing bromine, acetic acid and sodium acetate. The resulting 6-bromo-derivative is then heated with lithium chloride in the presence of dimethylformamide.

The 2α-fluoro substituents of the 5α-methyl-17α-lower alkyl-androstane-3-ones are obtained by passing perchloryl fluoride through a solution of the 5α-methyl-17α-lower alkyl-3-methoxy-2-androstene in a hydrocarbon solvent to which a small quantity of pyridine is added.

The 2α-methyl-substituents of the 5α-methyl-17α-lower alkyl-androstane-3-ones are obtained by treating the 5α-methyl-17α-lower alkyl-androstene-3-one sequentially with dimethyloxate, methyl iodide and sodium methoxide.

The [3,2-C]pyrazolo-derivatives of the 5α-methyl-17α-lower alkyl-androstane-3-ones are prepared by converting the 5α-methyl-17α-lower alkyl-androstane -3-one first into the corresponding 2-hydroxymethylene derivative by heating with sodium ethoxide in ethyl alcohol and ethyl formate, and then reacting the 2-hydroxymethylene derivatives with anhydrous hydrazine.

The 9α-halogen-derivatives of the 5α-methyl-androstane-17β-ol-3,11-diones are prepared from 5α-methyl-3 - methoxy - 2 - androstene - 17β - ol - 11 - one. The latter compound is obtained from the 4-androstene-17β-ol-3,11-dione-acetate by the following procedures: The 4-androstene-17β-ol-3,11-dione acetate is transformed into androstane-17β-ol-3,6,11-trione by bromination to the 6-bromo-derivative and subsequent treatment of the 6-bromo-derivative with an acidic reagent. The androstane-17β-ol-3,6,11-trione is then reacted with an acylating agent. Suitably the steroid is reacted with benzoylchloride to form androstane-17β-ol-3,6,11-trione-benzoate, which compound is then transformed into 3,3-dimethoxy-androstane-17β-ol-6,11-dione benzoate by heating with selenium dioxide and methanol. The 3,3-dimethoxy-androstane-17β-ol-6,11-dione benzoate so obtained is heated under suitable conditions to form 3-methoxy-2-androstene-17β-ol-dione benzoate, which is then methylated by reaction with sodium hydride and then with methyl iodide under controlled conditions to give 5α-methyl - 3 - methoxy - 2 - androstene - 17β - ol-6,11-dione benzoate. The latter compound is converted into 5α-methyl - 3 - methoxy - 2 - androstene - 17β - ol-11-one by elimination of the 6-keto group, suitably by reaction with hydrazine and potassium hydroxide. The 5α-methyl - 3 - methoxy - 2 - androstene - 17β - ol - 11-one is then converted into the 5α-methyl-3-methoxy-2,9(11)-androstadiene-17β-ol by the following steps: reaction with acetic anhydride in pyridine to form the corresponding acetate, reduction of the latter compound with sodium borohydride to form 5α-methyl-3-methoxy-2-androstene - 11β,17β - diol - 17 - acetate, dehydration of 5α - methyl - 3 - methoxy - 2 - androstene - 11β,17β-diol-17 acetate to give 5α-methyl-3-methoxy-2,9(11)-androstadiene-17β-ol-acetate and hydrolysis of the acetyl group to give 5α - methyl - 3 - methoxy - 2,9(11) - androstadiene - 17β - ol. The 5α - methyl - 3 - methoxy - 2,9(11)-androstadiene-17β-ol, or a derivative thereof, is used for the preparation of the corresponding 9α-halogen-5α-methyl-androstane-17β-ol-3,11-dione.

The 9α-halogen-derivatives of 5α,17α-dimethyl-androstane-17β-ol-3,11-dione are prepared by first converting the 5α - methyl - 3 - methoxy - 2,9(11) - androstadiene-17β-ol into the 5α,17α-dimethyl-3-methoxy-2,9(11)-androstadiene-17β-ol. This is accomplished by oxidizing the 5α - methyl - 3 - methoxy - 2,9(11) - androstadiene-17β-ol with chromic oxide in pyridine to give 5α-methyl-3 - methoxy - 2,9(11) - androstadiene - 17 - one, which compound is then reacted with methyl magnesium iodide to give 5α - 17α - dimethyl - 3 - methoxy - 2,9(11) - androstadiene-17β-ol.

The 5α,17α - dimethyl - 3 - methoxy - 2,9(11) - androstadiene-17β-ol is then transferred into the 5α, 17α-dimethyl - 9α - halogen - androstane - 3,11 - diones by the following procedures:

To form the 9α-bromo-derivative, 5α,17α-dimethyl-9(11)-androstene-17β-ol-3-one is reacted with N-bromosuccinimide to give 5α,17α-dimethyl-9α-bromo-androstane-11β,17β-diol-3-one, which compound is then oxidized with chromic oxide in pyridine to give 5α,17α-dimethyl-9β-bromo-androstane-17β-ol-3,11-dione.

To form the 9α-fluoro-derivative, the 5α,17α-dimethyl-9α-bromo-androstane-11β,17β-diol-3-one, obtained as above from 5α,17α-dimethyl-9(11)-androstene-17β-ol-3-one, is heated with potassium acetate to give 5α,17α-dimethyl-androstane-17β-ol-3-one-9β,11β-oxide, which is then reacted with hydrogen fluoride under suitable conditions to give 5α,17α-dimethyl-9α-fluoro-androstane-11β, 17β-diol-3-one. The latter compound is then oxidized with chromic oxide in pyridine to form 5α,17α-dimethyl-9α-fluoro-androstane-17β-ol-3,11-dione.

To produce the 9α-chloro-derivative, the 5α,17α-dimethyl - androstane - 17β - ol - 3 - one - 9β,11β - oxide, obtained as above, is reacted with hydrogen chloride to give 5α,17α - dimethyl - 9α - chloro - androstane - 11β, 17β-diol-3-one, which is then oxidized with chromic oxide in pyridine to give 5α,17α-dimethyl-9α-chloro-androstane-17β-ol-3,11-dione.

The 9α-halogen derivatives of 2α,5α,17α-trimethyl-androstane-17β-ol-3,11-dione are prepared from the 2α, 5α,17α - trimethyl - 9(11) - androstene - 17β - ol - 3-one. The latter compound is obtained by reaction of 5α,17α - dimethyl - 9(11) - androstene - 17β - ol - 3 - one sequentially with dimethyloxalate, methyl iodide and sodium methoxide.

The 2α,5α,17α - trimethyl - 9(11) - androstene - 17β-ol-3-one is then transformed into the 9α-halogen-derivatives of the 2α,5α,17α-trimethyl-androstane-17β-ol-3,11-dione by the following procedures:

To form the 9α-bromo derivatives, 2α,5α,17α-trimethyl-9(11)-androstene-17β-ol-3-one is reacted with N-bromosuccinimide to give 2α,5α,17α-trimethyl-9α-bromo-androstane-11β,17β-diol-3-one, which is then oxodized with chromic oxide in pyridine to give 2α,5α,17α-trimethyl-9α-bromo-androstane-17β-ol-3,11-dione.

To form the 9α-fluoro-derivative, the 2α,5α,17α-trimethyl - 9α - bromo - androstane - 11β,17β - diol - 3-one, obtained as above from 2α,5α,17α-trimethyl-9(11)-androstene-17β-ol-3-one, is heated with potassium acetate to give 2α,5α,17α-trimethyl-androstane-17β-ol-3-one-5,6-oxide, which is then reacted with hydrogen fluoride under suitable conditions to give 2α,5α,17α-trimethyl-9α-fluoro - androstane - 11β,17β - diol - 3 - one. The latter compound is then oxidized with chromic oxide in pyridine to form 2α,5α,17α - trimethyl - 9α - fluoro - androstane-17β-ol-3,11-dione.

To produce the 9α-chloro-derivatives, the 2α,5α,17α-trimethyl - androstane - 17β - ol - 3 - one - 5,6 - oxide, obtained as above, is reacted with hydrogen chloride to give 2α,5α,17α - trimethyl - 9α - chloro - androstane - 11β, 17β-diol-3-one, which is oxidized with chromic acid in pyridine to give 2α,5α,17α-trimethyl-9α-chloro-androstane-17β-ol-3,11-dione.

The 9α-halogen derivatives of 2α-fluoro-5α,17α-dimethyl-androstane-17β-ol-3,11-dione are prepared from the 2α - fluoro - 5α,17α-dimethyl-9(11)-androstene-17β-ol-3-one. The latter compound is obtained by passing perchoryl fluoride through a solution of 5α,17α-dimethyl-9(11)-androstene-17β-ol-3-one in a hydrocarbon solvent to which a small amount of pyridine has been added.

The 2α - fluoro-5α,17α-dimethyl-9(11)-androstene-17β-ol-3-one is then transformed into the 2α-fluoro-5α,17α-dimethyl-9α-halogen-derivatives by the following following procedures:

To form the 9α-bromo-derivatives, 2α-fluoro-5α,17α-dimethyl-9(11)-androstene-17β-ol-3-one is reacted with N-bromosuccinimide to give 2α-fluoro-5α,17α-dimethyl-9α-bromo-androstane-11β,17β-diol-3-one, which is then oxidized with chromic oxide in pyridine to give 2α-fluoro-5α,17α - dimethyl - 9α - bromo - androstane - 17β-ol-3,11-dione.

To form the 9α-fluoro-derivative, 2α-fluoro-5α,17α-dimethyl-9α-bromo-androstane-11β,17β-diol-3-one, obtained as above from 2α-fluoro-5α,17α-dimethyl-9(11)-androstene-17β-ol-3-one, is heated with potassium acetate to give 2α - fluoro-5α,17α-dimethyl-androstane-17β-ol-3-one-5,6-oxide, which is then reacted with hydrogen fluoride under suitable conditions to give 2α-fluoro-5α,17α-dimethyl-9α-fluoro-androstane-11β,17β-diol-3-one. The latter compound is then oxidized with chromic oxide in pyridine to form 2α-fluoro-5α,17α-dimethyl-9α-fluoro-androstane-17β-ol-3,11-dione.

To produce the 9α-chloro-derivative, the 2α-fluoro-5α, 17α-dimethyl-androstane-17β-ol-3-one-5,6-oxide, obtained as above, is reacted with hydrogen chloride to give 2α-fluoro - 5α,17α - dimethyl - 9α-chloro-androstane-11β-17β-diol-3-one, which is then oxidized with chromic oxide in pyridine to give 2α-fluoro-5α,17α-dimethyl-9α-chloro-androstane-17β-ol-3,11-dione.

The 5α-methyl-androstane-17β-ol-3,11-dione is obtained by reaction of the 5α-methyl-3-methoxy-2-androstene-17β-ol-11-one with an acidic reagent, for example, p-toluenesulfonic acid.

A further embodiment of this invention comprises novel pharmaceutical compositions containing these 5α-methyl-3-oxygenated steroid compounds. It is ordinarily preferred to utilize compositions comprising suspensions of the 5α-methyl-3-oxygenated steroid compounds in suitable pharmaceutical vehicles containing surfactants, suspending agents and the like.

The following examples illustrate methods of carrying out the present invention but it is to be understood that these examples are given for purposes of illustration and not of limitation.

*Example 1*

The 3-methoxy-2-androstene-17β-ol-6-one benzoate is prepared by the following procedure:

The 4-androstene-17β-ol-3-one acetate (19.2 g.) is converted to the 6α-bromo derivative by bromination with N-bromosuccinimide in carbon tetrachloride. Illumination from a 300 watt General Electric reflector spot lamp and about 10 mg. of benzoyl peroxide are used to catalyze the reaction. The crude bromination product is refluxed with 16 ml. of concentrated hydrochloric acid in 400 ml. of methanol for 3 hours and allowed to stand at room temperature overnight. The reaction mixture is then treated with 20 g. of sodium acetate, and concentrated in vacuo to a small volume. The residue is diluted with water and extracted with chloroform. The chloroform solution is washed with aqueous sodium bicarbonate solution, dried and concentrated in vacuo. Crystallization from ether:petroleum ether mixtures gives 2.0 g. of androstane-17β-ol-3,6-dione, M.P. 222–227° C. Treatment of the mother liquors with 200 mg. of p-toluenesulfonic acid in 200 ml. of acetone at room temperature overnight gives an additional 5.9 g. of androstane-17β-ol-3,6-dione, M.P. 226–233° C.

An ice cold solution consisting of 6.0 g. of androstane-17β-ol-3,6-dione in 40 ml. of anhydrous pyridine is treated with 2.54 ml. of benzoyl chloride and allowed to stand at room temperature overnight. The reaction mixture is then diluted with a 2:3 chloroform:ether mixture and washed sequentially with ice cold 10% aqueous sodium carbonate solution, cold dilute acetic acid, water and cold 5% aqueous sodium bicarbonate solution. The organic layer is dried and concentrated in vacuo. Crystallization from ethyl acetate affords 6.2 g. (78%) of androstane-17β-ol-3,6-dione benzoate, M.P. 230–234° C. The sample for analysis, recrystallized from ethyl acetate, has the following properties: M.P. 232–235° C.; $a_D^{24}$ +30 (c. 0.9 CHCl$_3$). Analysis.—Calculated for $C_{26}H_{32}O_4$: C, 76.44; H, 7.90. Found: C, 76.37; H, 7.79.

A suspension consisting of 7.0 g. of androstane-17β-ol-3,6-dione benzoate and 20 g. of selenium dioxide in 500 ml. of methanol is heated at 50–55° C. for two hours, during which time the steroid goes into solution. The mixture is then allowed to stand at room temperature for one hour and cooled in ice. An ice cold solution of 20 g. of potassium hydroxide in 100 ml. of water is added and the resulting solution poured into 3 liters of water. The product is filtered and chromatographed on 140 g. of basic alumina. The chromatogram is eluted with mixtures of ether and petroleum ether. The combined eluates yield a product which on crystallization from methanol give 6.7 g. (87%) of 3,3-dimethoxy-androstane-17β-ol-6-one benzoate, M.P. 158–161° C. The sample for analysis is recrystallized from methanol M.P. 158–161° C. and has the following properties: $a_D^{25}$ +19° (c. 0.8 CHCl$_3$). Analysis.—Calculated for $C_{28}H_{38}O_5$: C, 73.98; H, 8.43. Found: C, 74.41; H, 8.53.

A 15 cc. centrifuge tube containing 270 mg. of 3,3-dimethoxy-androstane-17β-ol-6-one benzoate and 0.20 g. of powdered soft glass is capped with a glass wool plug and heated in a Wood's metal bath at 215±3° C. for 35 minutes. The cooled melt is dissolved in chloroform, filtered and concentrated. Chromatography on 15 g. of basic alumina and elution with mixtures of ether and petroleum ether gives 147 mg. (58%) of 3-methoxy-2-androstene-17β-ol-6-one benzoate, M.P. 216–228° C. The sample for analysis, crystallized from ethyl acetate, has the following properties: M.P. 228–235° C.; $a_D^{25}$ +46° (c. 0.9 CHCl$_3$). Analysis.—Calculated for $C_{27}H_{34}O_4$: C, 76.74; H, 8.11. Found, C, 77.02; H, 7.80.

Example 2

The 3-methoxy-2-androstane-17β-ol-6-one benzoate (Example 1) is methylated to the 5α-methyl derivative by the following procedure:

A solution of 3.33 g. of 3-methoxy-2-androstene-17β-ol-6-one benzoate in 70 ml. of xylene is dried by azeotropic distillation. The solution is cooled and 450 mg. of a dispersion of 53% sodium hydride in mineral oil, and one drop of t-butanol, is added to the solution. The reaction mixture is then refluxed under nitrogen for 50 minutes. The yellow suspension is cooled. Twenty ml. of methyl iodide, dried by passing through a tube filled with calcium chloride, is added and the suspension is refluxed overnight. The cooled solution is poured into water, separated, and the aqueous layer extracted with benzene. The combined benzene extracts are washed with water, dried and concentrated in vacuo. Chromatography on 320 g. of basic alumina, and elution with a 4:6 mixture of ether and petroleum ether affords fraction I, from which is recovered 90 mg., of 5α-methyl-3,17β-dimethoxy-2-androstene-6-one, M.P. 155–165° C. Crystallization from ether gives an analytical sample, M.P. 164–170° C., $a_D^{22}$ −12° (c. 0.5 CHCl$_3$). Analysis.—Calculated for $C_{22}H_{34}O_3$: C, 76.26; H, 9.89. Found: C. 76.64; H, 9.84. Elution with a 5:5 mixture of ether and petroleum ether affords fraction II, consisting of 1325 mg. of material containing 5α-methyl-3-methoxy-2-androstene-17β-ol-6-one benzoate. Further elution with ether affords fraction III, from which is recovered about 1.0 g. of starting material. Crystallization of fraction II from ether gives 0.32 g. of 5α-methyl-3-methoxy-2-androstene-17β-ol-6-one benzoate, M.P. 159–167° C. Two rechromatograms of the mother liquors, elution with 8:12 and 9:11 mixtures of ether and petroleum ether, and crystallization from ethyl acetate yields 0.52 g. of 5α-methyl-3-methoxy-2-androstene-17β-ol-one benzoate, a total of 0.84 g. The yield is about 35% taking into consideration the recovered starting material. The sample for analysis is crystallized from a mixture of ether and petroleum ether, M.P. 164–167° C.; $a_D^{22}$ +18° (c. 0.6 CHCl$_3$). Three quaternary methyl groups are indicated by nuclear magnetic resonance. Analysis.—Calculated for $C_{28}H_{36}O_4$: C, 77.03; H, 8.31. Found: C, 77.27; H, 8.15. A sample, M.P. 167–172° C., is obtained by recrystallization from ethyl acetate.

Example 3

A solution consisting of 0.435 g. of 5α-methyl-3-methoxy-2-androstene-17β-ol-6-one benzoate, 5 ml. of 85% hydrazine hydrate and 3.5 g. of potassium hydroxide in 50 ml. of diethylene glycol is heated under nitrogen at 152–168° C. for 1.75 hours. The temperature is raised by removing an aqueous fraction by distillation, and is then maintained at 225° C. for four hours. The solution is cooled and allowed to stand at room temperature overnight. The solution is then extracted with ether, and the ether layer washed with water, dried and concentrated.

The crude 5α-methyl-3-methoxy-2-androstene-17β-ol so obtained is percolated through 15 g. of basic alumina, eluted with a 2:8 mixture of chloroform and ether, and then hydrolyzed with 45 mg. of p-toluenesulfonic acid in 30 ml. of acetone at room temperature overnight. The acetone solution is poured into aqueous sodium bicarbonate solution and extracted with chloroform. The chloroform layer is washed with water, dried and concentrated. Two crystallizations from methanol affords 88 mg. of a 5α-methyl-androstane-17β-ol-3-one, M.P. 196–201° C.; $(a)_D$ +40° (c. 0.7 CHCl$_3$); nuclear molecular rotation indicates three quaternary carbon-methyl groups. Calculated for $C_{20}H_{32}O_2$: C, 78.89; H, 10.59. Found: C, 78.73; H, 10.79. A sample, M.P. 201–202° C., is obtained by methanol recrystallization; $(a)_D$ +43°; $(a)_{400}$ +141°; $(a)_{350}$ +302; $(a)_{325}$ +832; $(a)_{315}$ +1110°; $(a)_{300}$ +369°; $(a)_{286}$ −351° (c. 0.18 dioxane). Chromatography of the mother liquors on 20 g. of acid washed alumina, and elution with a 8:2 mixture of ether and petroleum ether affords 50 mg. of a product, M.P. 203–204° C., on crystallization from methanol. It is presumably 5α-methyl-androstane-17β-ol. Further elution with mixtures of ether and petroleum ether yields an additional 95 mg. of 5α-methyl-androstane-17β-ol-3-one, which on crystallization from methanol has a melting point of 196–200° C., giving a total of 183 mg. (approximately a 60% yield).

Example 4

The 5α-methyl-androstane-3α,17β-diol is prepared by hydrogenating a mixture of 200 mg. of 5α-methyl-androstane-17β-ol-3-one (Example 3) and 100 mg. of platinum oxide in 10 ml. of acetic acid at atmospheric pressure. The solution is filtered and concentrated in vacuo. Chromatography on alumina gives the 5α-17α-dimethyl-androstane-3α,17β-diol.

The 5α-methyl-androstane-3β,17β-diol is prepared from the 5α-methyl-androstane-17β-ol-3-one (Example 3) by reduction with sodium borohydride. A mixture of 200 mg. of 5α-methyl-androstane-17β-ol-3-one, 200 mg. of sodium borohydride, 8 ml. of tetrahydrofuran and 2 ml. of water is stirred at room temperature for 3 hours. The reaction mixture is then poured into aqueous sodium dihydrogen phosphate and extracted with chloroform. The chloroform layer is washed with water, dried and concentrated. Chromatography affords the 5α-methyl-3β-17β-diol.

Example 5

A solution of 300 mg. of 5α-methylandrostane-17β-ol-3-one and 250 mg. of p-toluenesulfonic acid in 10 ml. of acetic acid is brominated at 20° C. with a solution containing 153 mg. of bromine and 88 mg. of sodium acetate in 4 ml. of acetic acid. At the end of the reaction 2.9 g. of sodium acetate in 6 ml. of water is added. The reaction mixture is diluted with ice water and filtered.

The crude bromide is dried and heated at 100° C. with 400 mg. of lithium chloride and 10 ml. of dimethylformamide for 2.5 hours. The cooled reaction mixture is poured into water, extracted with chloroform and the organic phase washed with water, dried and concentrated in vacuo. Chromatography on acid washed alumina of the crude product gives 5α-methyl-1-androstene-17-β-ol-3-one.

Example 6

The 5α-methyl-2α-fluoro-androstane-17β-ol-3-one is prepared by bubbling perchloryl fluoride through a solution of 200 mg. of 5α-methyl-3-methoxy-2-androstene-17β-ol-3-one in 10 ml. of benzene and 1 ml. of pyridine maintained at 0° C. The solution is allowed to stand for one hour, washed with aqueous sodium bicarbonate and concentrated in vacuo. The residual material is separated by chromatography on alumina to give the 5α-methyl-2α-fluoro-androstane-17β-ol-3-one.

Example 7

To 8.0 g. of 5α-methyl-androstane-17β-ol-3-one suspended in 100 ml. of t-butyl alcohol is added 3.2 g. of commercial (95%) sodium methylate. To this mixture under nitrogen is added 5 ml. of diethyl oxalate, and the mixture is then stirred under nitrogen for 6 hours. Addition of ether followed by filtration gives the sodium enolate a powder which is soluble in water but insoluble in dilute acid.

A mixture of the crude sodium enolate, 13 g. of anhydrous $K_2CO_3$, 300 ml. of acetone and 50 ml. of methyl iodide is refluxed for 20 hours, filtered while hot and the filtrate concentrated to a small volume. A large amount of water is added to the concentrate, which is then extracted with ethyl acetate. The extract is washed with saturated sodium chloride solution, dried and treated with activated carbon. After evaporation, a pale yellow glass is obtained.

To this glassy material, dissolved in 250 ml. of absolute alcohol, is added 1.0 g. of 95% $NaOCH_3$. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried and decolorized with activated carbon. Evaporation leaves the crude 2α,5α-dimethylandrostane-17β-ol-3-one.

Example 8

A solution of 200 mg. of 5α-methyl-androstane-17β-ol-3-one in 10 ml. of 1 N ethanolic sodium ethoxide and 2 ml. of ethyl formate is heated at reflux for 2 hours. The solution is cooled and acidified with dilute sulfuric acid. The solution is concentrated in vacuo to a small volume, diluted with water and extracted with chloroform. The chloroform solution is washed with water, dried and concentrated in vacuo. Chromatography on acid washed alumina gives the 2-hydroxymethylene-5α-methyl-androstane-17β-ol-3-one.

A solution of 200 mg. of 2-hydroxymethylene-5α-methyl-androstane-17β-ol-3-one in 5 ml. of ethanol is refluxed with 1 ml. of anhydrous hydrazine for 2 hours. The reaction mixture is diluted with water and filtered. Chromatography on alumina gives the 5α-methyl-androstane-[3,2-C]-pyrazole-17β-ol.

Example 9

The 5α-17α-dimethyl-androstane-17β-ol-3-one is prepared by the following procedure:

The 5α-methyl-3-methoxy-2-androstene-17β-ol (Example 3) is oxidized with chromium trioxide in pyridine to give the 5α-methyl-3-methoxy-2-androstene-17-one. For this purpose a solution of 400 mg. of 5α-methyl-3-methoxy-2-androstene-17β-ol in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with water. The organic solvent layer is then dried, the solvents are evaporated therefrom in vacuo, and the residual material is purified by crystallization from ethyl acetate-ether to give 5α-methyl-3-methoxy-2-androstene-17-one.

A methyl Grignard reagent is prepared by adding, with stirring, a solution containing 3 cc. of methyl iodide in 10 cc. of ether to 300 mg. of magnesium covered with 10 cc. of ether. After the magnesium has been consumed, an additional 20 cc. of ether is added. To this solution is added 2.0 g. of the 5α-methyl-3-methoxy-2-androstene-17-one in ether. The reaction mixture is allowed to stand at room temperature overnight, decomposed with water and the ether layer separated. The ether layer is dried and concentrated in vacuo. Chromatography of the residual material on basic alumina, and elution with mixtures of petroleum ether gives the 5α,17α-dimethyl-3-methoxy-2-androstene-17β-ol.

Treatment of 5α,17α-dimethyl-3-methoxy-2-androstene-17β-ol with p-toluenesulfonic acid in acetone at room temperature overnight produces the 5α,17α-dimethyl-androstane-17β-ol-3-one.

The 5α-17α-dimethyl-androstane-3α-17β-diol is prepared by hydrogenating a mixture of 200 mg. of 5α,17α-dimethyl-androstane-17β-ol-3-one (Example 3) and 100 mg. of platinum oxide in 10 ml. of acetic acid at atmospheric pressure. The solution is filtered and concentrated in vacuo. Chromatography on alumina gives the 5α,17α-dimethyl-androstane-3α,17β-diol.

The 5α,17α-dimethyl-androstane-3β-17β-diol is prepared from the 5α,17α-dimethyl-androstane-17β-ol-3-one (Example 3) by reduction with sodium borohydride. A mixture of 200 mg. of 5α,17α-dimethyl-androstane-17β-ol-3-one, 200 mg. of sodium borohydride, 8 ml. of tetrahydrofuran and 2 ml. of water is stirred at room temperature for 3 hours. The reaction mixture is then poured into aqueous sodium dihydrogen phosphate and extracted with chloroform. The chloroform layer is washed with water, dried and concentrated. Chromatography affords the 5α,17α-dimethyl-androstane-3β,17β-diol.

A solution of 300 mg. of 5α,17α-dimethyl-androstane-17β-ol-3-one and 250 mg. of p-toluenesulfonic acid in 10 ml. of acetic acid is brominated at 20° C. with a solution containing 153 mg. of bromine and 88 mg. of sodium acetate in 4 ml. of acetic acid. At the end of the reaction 2.9 g. of sodium acetate in 6 ml. of water is added. The reaction mixture is diluted with ice water and filtered. The crude bromide is dried and heated at 100° C. with 400 mg. of lithium chloride and 10 ml. of dimethylformamide for 2.5 hours. The cooled reaction mixture is poured into water, extracted with chloroform and the organic phase washed with water, dried and concentrated in vacuo. Chromatography on acid washed alumina of the crude product gives 5α,17α-dimethyl-1-androstene-17β-ol-3-one.

The 5α,17α-dimethyl-2α-fluoro-androstane,17β-ol-3-one is prepared by bubbling perchloryl fluoride through a solution of 200 mg. of 5α,17α-dimethyl-3-methoxy-2-androstene-17β-ol in 10 ml. of benzene and 1 ml. of pyridine, maintained at 0° C. The solution is allowed to stand for 1 hour, washed with aqueous sodium bicarbonate solution, and concentrated in vacuo. Chromatography of the residual material gives the 2α-fluoro-5α,17α-dimethyl-androstane-17β-ol-3-one.

To 8.0 g. of 5α,17α-dimethyl-androstane-17β-ol-3-one suspended in 100 ml. of t-butyl alcohol is added 3.2 g. of commercial (95%) sodium methylate. To this mixture under nitrogen is added 5 ml. of diethyl oxalate, and the mixture is then stirred under nitrogen for 6 hours. Addition of ether followed by filtration gives the sodium enolate, a powder which is soluble in water but insoluble in dilute acid.

A mixture of the crude sodium enolate, 13 g. of anhydrous potassium acetate, 300 ml. of acetone and 50 ml. of methyl iodide is refluxed for 20 hours, filtered while hot and the filtrate concentrated to a small volume. A large amount of water is added to the concentrate, which is then extracted with ethyl acetate. The extract is washed with saturated sodium chloride solution, dried and treated with activated carbon. After evaporation a pale glass is obtained.

To this glassy material, dissolved in 250 ml. of absolute alcohol, is added 1.0 g. of 95% sodium methylate. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried and decolorized with activated carbon. Evaporation leaves the crude $2\alpha,5\alpha,17\alpha$-trimethyl-androstane-17$\beta$-ol-one.

A solution of 200 mg. of $5\alpha,17\alpha$-dimethyl-androstane-17$\beta$-ol-3-one in 10 ml. of 1 N-ethanolic sodium ethoxide and 2 ml. of ethyl formate is heated at reflux for 2 hours. The solution is cooled and acidified with dilute sulfuric acid. The solution is concentrated in vacuo to a small volume, diluted with water and extracted with chloroform. The chloroform solution is washed with water, dried and concentrated in vacuo. Chromatography on acid washed alumina gives the $5\alpha$-methyl-2-hydroxy-methylene-androstane-17$\beta$-ol-3-one.

A solution of 200 mg. of $5\alpha$-methyl-2-hydroxy-methylene-androstane-17$\beta$-ol-3-one in 5 ml. of ethanol is refluxed with 1 ml. of anhydrous hydrazine for 2 hours. The reaction mixture is diluted with water and filtered. Chromatography gives the $5\alpha,17\alpha$-dimethylandrostane-17$\beta$-ol-[3,2-C]-pyrazole.

Example 10

A slow stream of acetylene is passed into a stirred solution of potassium t-amylate prepared from 5 grams of potassium in 100 cc. of t-amyl alcohol and 100 ml. of ether, maintained at 0° C. After saturation of the solution with acetylene, 5.0 grams of $5\alpha$-methyl-3-methoxy-2-androstene-17-one (Example 9) is added. Acetylene addition is continued for 3 hours at 0° C. and then at room temperature for 18 hours. A 100 ml. of 10% ammonium chloride solution is added and the t-amyl alcohol removed in vacuo. Dilution with water, extraction with chloroform, drying and concentrating, followed by chromatography gives the $5\alpha$-methyl-17$\alpha$-ethynyl-3-methoxy-2-androstene-17$\beta$-ol. Treatment of the $5\alpha$-methyl-17$\alpha$-ethynyl-3-methoxy-2-androstene-17$\beta$-ol with 45 mg. of p-toluenesulfonic acid in 30 ml. of acetone at room temperature overnight gives the $5\alpha$-methyl-17$\alpha$-ethynyl-androstane-17$\beta$-ol-3-one.

The product is recovered by pouring it into aqueous sodium bicarbonate solution and extracting with chloroform. The chloroform layer is washed with water, dried and concentrated. The residual material is crystallized to give the $5\alpha$-methyl-17$\alpha$-ethynyl-androstane-17$\beta$-ol-3-one.

A mixture of 0.20 gram of $5\alpha$-methyl-17$\alpha$-ethynyl-androstane-17$\beta$-ol-3-one and 50 mg. of Lindlar catalyst in 15 ml. of ethyl acetate is hydrogenated at atmospheric pressure. The solution is filtered and concentrated after absorption of one mole of hydrogen. Chromatography of the concentrate gives the $5\alpha$-methyl-17$\alpha$-vinyl-androstane-17$\beta$-ol-3-one ($5\alpha$-methyl-20-pregnene-17$\beta$-ol-3-one).

A mixture of 0.20 gram of $5\alpha$-methyl-17$\alpha$-ethynyl-androstane-17$\beta$-ol-3-one and 50 mg. of 5% Pd/C in 15 ml. of ethyl acetate is hydrogenated at atmospheric pressure. The solution is filtered and concentrated after an uptake of two moles of hydrogen. Chromatography gives the $5\alpha$-methyl-17$\alpha$-ethyl-androstane-17$\beta$-ol-3-one ($5\alpha$-methyl-pregnane-17$\beta$-ol-3-one).

Example 11

The 3-methoxy-2-androstene-17$\beta$-ol-6,11-dione benzoate is prepared by the following procedure: 4-androstene-17$\beta$-ol-3,11-dione acetate is brominated with N-bromosuccinimide in carbon tetrachloride. Illumination from a 300 watt General Electric reflector spot lamp and about 10 mg. of benzoyl peroxide are used to catalyze the reaction. The crude bromination product is refluxed with 16 ml. of concentrated hydrochloric acid in 400 ml. of methanol for 3 hours and allowed to stand at room temperature overnight. The reaction mixture is then treated with 2.0 g. of sodium acetate and concentrated in vacuo to a small volume. The residue is diluted with water and extracted with chloroform. The chloroform solution is washed with aqueous sodium bicarbonate solution, dried and concentrated in vacuo. Crystallization from ether-petroleum ether mixtures gives androstane-17$\beta$-ol-3,6,11-trione. Treatment of the mother liquors with 200 mg. of p-toluenesulfonic acid in 200 ml. of acetone at room temperature overnight gives an additional androstane-17$\beta$-ol-3,6,11-trione.

An ice cold solution consisting of 6.0 g. of androstane-17$\beta$-ol-3,6,11-trione in 40 ml. of anhydrous pyridine is treated with 2.54 ml. of benzoyl chloride and allowed to stand at room temperature overnight. The reaction mixture is then diluted with a 2:3 mixture of chloroform and ether and washed sequentially with ice cold 10% aqueous sodium carbonate solution, cold dilute acetic acid, water and cold 5% aqueous sodium bicarbonate solution. The organic layer is dried and concentrated in vacuo. Crystallization from ethyl acetate affords androstane-17$\beta$-ol-3,6,11-trione benzoate. A suspension consisting of 7.0 g. of androstane-17$\beta$-ol-3,6,11-trione benzoate and 20 g. of selenium dioxide in 500 ml. of methanol is heated at 50–55° C. for two hours. The mixture is then allowed to stand at room temperature for one hour and cooled in ice. An ice cold solution of 20 g. of potassium hydroxide in 100 ml. of water is added and the resulting solution poured into 3 liters of water. The product is filtered and chromatographed on 140 g. of basic alumina. The chromatogram is eluted with mixtures of ether to which benzene has been added, and petroleum ether. The combined eluates yield a product which on crystallization from methanol gives 3,3-dimethoxy-androstane-17$\beta$-ol-6,11-dione benzoate.

A 15 cc. centrifuge tube containing 270 mg. of 3,3-dimethoxy-androstane-17$\beta$-ol-6,11-dione benzoate and 0.20 g. of powdered soft glass is capped with a glass wool plug and heated in a Wood's metal bath at 215±3° C. for 35 minutes. The cooled melt is dissolved in chloroform, filtered and concentrated. Chromatography on 15 g. of basic alumina, and elution with mixtures of ether and petroleum ether gives 3-methoxy-2-androstene-17$\beta$-ol-6,11-dione benzoate.

Example 12

A solution of 3.33 g. of 3-methoxy-2-androstene-17$\beta$-ol-6,11-dione benzoate in 70 ml. of xylene is dried by azeotropic distillation. The solution is cooled and 450 mg. of a dispersion of 53% sodium hydride in mineral oil, and one drop of t-butanol is added to the solution. The reaction mixture is then refluxed under nitrogen for 50 minutes. The yellow suspension is cooled. Twenty ml. of methyl iodide, dried by passing through a tube filled with calcium chloride, is added and the suspension is refluxed overnight. The cooled solution is poured into water, separated, and the aqueous layer extracted with benzene. The combined benzene extracts are washed with water, dried and concentrated in vacuo. The residual material so obtained is separated by chromatography on alumina to give $5\alpha$-methyl-3-methoxy-2-androstene-17$\beta$-ol-6,11-dione benzoate.

Example 13

A solution consisting of 0.435 g. of 5α-methyl-3-methoxy-2-androstene-17β-ol-6,11-dione benzoate, 5 ml. of 85% hydrazine hydrate and 3.5 g. of potassium hydroxide in 50 ml. of diethylene glycol is heated under nitrogen at 152–168° C. for 1.75 hours. The temperature is raised by removing an aqueous fraction by distillation, and is then maintained at 225° C. for four hours. The solution is cooled and allowed to stand at room temperature overnight. The solution is then extracted with ether, and the ether layer washed with water, dried and concentrated.

The crude 5α-methyl-3-methoxy-2-androstene-17β-ol-11-one so obtained is percolated through 15 g. of basic alumina, eluted with a mixture of chloroform and ether, and then hydrolyzed with 45 mg. of p-toluenesulfonic acid in 30 ml. of acetone at room temperature overnight. The acetone solution is poured into aqueous sodium bicarbonate solution and extracted with chloroform. The chloroform layer is washed with water, dried and concentrated. The concentrate is crystallized to give 5α-methyl-androstane-17β-ol-3,11-dione.

Example 14

The 5α-methyl-3-methoxy-2,9(11)androstadiene-17β-ol is prepared from 5α-methyl-3-methoxy-2-androstene-17β-ol-11-one, using the following procedure:

To a solution of 100 mg. of the 5α-methyl-3-methoxy-2-androstene-17β-ol-11-one in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed with water. The ethyl acetate solution is dried with anhydrous sodium sulfate. The solvent is then distilled at about 40° C. in vacuo. The product is then crystallized from a solvent. Alternately the product may be chromatographed on basic alumina and the 5α-methyl-3-methoxy-2-androstene-17β-ol-11-one acetate is isolated by crystallization of the appropriate eluate.

A mixture of 200 mg. of 5α-methyl-3-methoxy-2-androstene-17β-ol-11-one acetate, 200 mg. of sodium borohydride, 8 ml. of tetrahydrofuran and 2 ml. of water is stirred at room temperature for 3 hours. The reaction mixture is then poured into aqueous sodium dihydrogen phosphate and extracted with chloroform. The chloroform layer is washed with water, dried and concentrated. Chromatography of the concentrate gives 5α-methyl-3-methoxy-2-androstene-11,17β-diol-17-acetate.

To bring about the dehydration, a solution of 400 mg. of 5α-methyl-3-methoxy-2-androstene-11,17β-diol-17-acetate in 2.0 ml. dimethylformamide, 0.8 ml. of pyridine and 0.4 ml. of methanesulfonyl chloride is kept at 75° C. for one hour. The mixture is cooled and water is added. The precipitate formed is filtered, washed with water and dried in air. The desired 5α-methyl-3-methoxy-2,9(11)androstadiene-17β-ol acetate is purified by chromatography on 20 g. of alumina and elution with benzene. Crystallization of the material eluted by benzene gives pure 5α-methyl-3-methoxy-2,9(11)androstadiene-17β-ol acetate.

A solution of 0.30 g. of 5α-methyl-3-methoxy-2,9(11)androstadiene-17β-ol acetate in 10 cc. of methanol is refluxed with 1 g. of potassium hydroxide in 2 ml. of water for one hour under nitrogen. The cooled solution is diluted with water, extracted with chloroform and the extract is dried and concentrated. Chromatography on basic alumina yields 5α-methyl-3-methoxy-2,9(11)androstadiene-17β-ol.

Example 15

The 5α,17α-dimethyl-9(11)androstene-17β-ol-3-one is prepared from 5α-methyl-3-methoxy-2,9(11)androstadiene-17β-ol (Example 14) using the following procedure:

A solution of 400 mg. of 5α-methyl-3-methoxy-2,9(11)-androstadiene-17β-ol in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 5α-methyl-3-methoxy-2,9(11)androstadiene-17-one.

A methyl Grignard reagent is prepared by adding, with stirring, a solution containing 3 cc. of methyl iodide in 10 cc. of ether to 300 mg. of magnesium covered with 10 cc. of ether. After the magnesium has been consumed, an additional 20 cc. of ether is added. To this solution is added 2.0 g. of the 5α-methyl-3-methoxy-2,9(11)androstadiene-17-one in ether. The reaction mixture is allowed to stand at room temperature overnight, decomposed with water and the ether layer separated. The ether layer is dried and concentrated in vacuo. Chromatography of the residual material on basic alumina, and elution with mixtures of petroleum ether gives the 5α,17α-dimethyl-3-methoxy-2,9(11)androstadiene-17β-ol.

Treatment of 5α,17α-dimethyl-3-methoxy-2,9(11)androstadiene-17β-ol with p-toluenesulfonic acid in acetone at room temperature overnight produces the 5α,17α-dimethyl-9(11)androstene-17β-ol-3-one.

Example 16

The 5α,17α-dimethyl-9(11)androstene-17α-ol-3-one is converted into the 9α-bromo-, 9α-fluoro-, and 9α-chloroderivatives, respectively, by the procedures outlined below:

To a mixture of 620 mg. of 5α,17α-dimethyl-9(11)androstene-17β-ol-3-one and 330 mg. of N-bromo-succinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and the crystalline bromohydrin, 5α,17α-dimethyl-9α-bromo-androstane-11β,17β-diol-3-one is filtered, washed with water, and dried in air.

A solution of 400 mg. of 5α,17α-dimethyl-9α-bromo-androstane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 5α,17α-dimethyl-9α-bromo-androstane-17β-ol-3,11-dione.

A solution of 210 mg. of 5α,17α-dimethyl-9α-bromo-androstane-11β,17β-diol-3-one and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized to give 5α,17α-dimethyl-androstane-17β-ol-3-one-9β,11β-oxide.

To a solution of 200 mg. of 5α,17α-dimethyl-androstane-17β-ol-3-one-9β,11β-oxide in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −30° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization gives 5α,17α-dimethyl-9α-fluoro-androstane-11β,17β-diol-3-one.

A solution of 400 mg. of 5α,17α-dimethyl-9α-fluoro-androstane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystalization to give 5α,17α-dimethyl-9α-fluoro-androstane-17β-ol-3,11-dione.

To a solution of 100 mg. of 5α,17α-dimethyl-androstane-17β-ol-3-one-9β,11β-oxide in 4 ml. of chloroform is added 5 ml. of concentrated hydrochloric acid. The two-phase mixture is stirred at 25° C. for one hour. Addition of water and chloroform extraction gives a crude product which is hydrolyzed by treatment with potassium bicarbonate in aqueous methanol to give 5α,17α-dimethyl-9α-chloro-androstane-11β,17β-diol-3-one.

A solution of 400 mg. of 5α,17α-dimethyl-9α-chloro-androstane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 5α,17α-dimethyl-9α-chloro-androstane-17β-ol-3,11-dione.

*Example 17*

The 5α,17α-dimethyl-9(11)androstene-17β-ol-3-one is converted into 2α,5α,17α-trimethyl-9(11)androstene-17β-ol-3-one by the following procedure:

To 8.0 g. of 5α,17α-dimethyl-9(11)androstene-17β-ol-3-one suspended in 100 ml. of t-butyl alcohol is added 3.2 g. of commercial (95%) sodium methylate. To this mixture under nitrogen is added 5 ml. of dimethyl oxalate, and the mixture is then stirred under nitrogen for 6 hours. Addition of ether followed by filtration gives the sodium enolate, which is a powder, soluble in water but insoluble in dilute acid.

A mixture of the crude sodium enolate, 13 g. of anhydrous of $K_2CO_3$, 300 ml. of acetone and 50 ml. of methyl iodide is refluxed for 20 hours, filtered while hot, and the filtrate concentrated to a small volume. A large amount of water is added to the concentrate which is then extracted with ethyl acetate. The extract is washed with saturated sodium chloride solution, dried and treated with activated carbon. After evaporation a pale yellow glass is obtained.

To this glassy material, dissolved in 250 ml. of absolute alcohol, is added 1.0 g. of 95% $NaOCH_3$. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried, and decolorized with activated carbon. Evaporation leaves the crude 2α,5α,17α-trimethyl-9(11)androstene-17β-ol-3-one.

*Example 18*

The 2α,5α,17α-trimethyl-9(11)androstene-17α-ol-3-one is converted into the 9α-bromo-, 9α-fluoro-, and 9α-chloro-derivatives, respectively, by the procedures outlined below:

To a mixture of 620 mg. of 2α,5α,17α-trimethyl-9(11)-androstene 17β-ol-3-one and 330 mg. of N-bromo-succinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and the crystalline bromohydrin, 2α,5α,17α-trimethyl-9α-bromo-androstane-11β,17β-diol-3-one is filtered, washed with water, and dried in air.

A solution of 400 mg. of 2α,5α,17α-trimethyl-9α-bromo-androstane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalling material is purified by crystallization to give 2α,5α,17α-trimethyl-9α-bromo-androstane-17β-ol-3,11-dione.

A solution of 210 mg. of 2α,5α,17α-trimethyl-9α-bromo-androstane-11β,17β-diol-3-one and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized to give 2α,5α,17α-trimethyl-androstane-17β-ol-3-one-9β,11β-oxide.

To a solution of 200 mg. of 2α,5α,17α-trimethyl-androstane-17β-ol-3-one-9β,11β-oxide in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −30° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization gives 2α,5α,17α-trimethyl-9α-fluoro-androstane-11β,17β-diol-3-one.

A solution of 400 mg. of 2α,5α,17α-trimethyl-9α-fluoro-androstane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 2α,5α,17α-trimethyl-9α-fluoro-androstane-17β-ol-3,11-dione.

To a solution of 100 mg. of 2α,5α,17α-trimethyl-androstane-17β-ol-3-one-9β,11β-oxide in 4 ml. of chloroform is added 5 ml. of concentrated hydrochloric acid. The two-phase mixture is stirred at 25° C. for 1 hour. Addition of water and chloroform extraction gives a crude product which is hydrolyzed by treatment with potassium bicarbonate in aqueous methanol to give 2α,5α,17α-trimethyl-9α-chloro-androstane-11β,17β-diol-3-one.

A solution of 2α,5α,17α-trimethyl-9α-chloroandrostane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 2α,5α,17α-trimethyl-9α-chloroandrostane-17β-ol-3,11-dione.

*Example 19*

To 8.0 g. of 5α,17α-dimethyl-9(11)androstene-17β-ol-3-one suspended in 100 ml. of t-butyl alcohol is added 3.2 g. of commercial 95% sodium methylate. To this mixture under nitrogen is added 5 ml. of dimethyl oxalate, and the mixture is then stirred under nitrogen for 6 hours. Addition of ether followed by filtration gives the glyoxate sodium enolate. Perchloryl fluoride is bubbled through a solution of 200 mg. of the sodium enolate in 10 cc. of methanol at 0° C. The solution is allowed to stand for one hour, washed with aqueous sodium bicarbonate and concentrated in vacuo. The residual material, dissolved in 250 ml. of absolute alcohol, is added to 1.0 g. of 95% sodium methylate. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried and decolorized with activated carbon. Evaporation gives 2α-fluoro-5α,17α-dimethyl-9(11)androstene-17β-ol-3-one.

*Example 20*

The 5α,17α-dimethyl-2α-fluoro-9(11)androstene-17α-ol-3-one is converted into the 9α-bromo-, 9α-fluoro-, and 9α-chloro-derivatives, respectively, by the procedures outlined below:

To a mixture of 620 mg. of 5α,17α-dimethyl-2α-fluoro-9(11)androstene-17β-ol-3-one and 330 mg. of N-bromosuccinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and the crystalline bromohydrin, 5α,17α-dimethyl-2α-fluoro-9α-bromo-androstane-11β,17β-diol-3-one is filtered, washed with water, and dried in air.

A solution of 400 mg. of 5α,17α-dimethyl-2α-fluoro-9α-bromo-androstane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 5α,17α-dimethyl-2α-fluoro-9α-bromo-androstane-17β-ol-3,11-dione.

A solution of 210 mg. of 5α,17α-dimethyl-2α-fluoro-9α-bromo-androstane-11β,17β-diol-3-one and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized to give 5α,17α-dimethyl-2α-fluoro-androstane-17β-ol-3-one-9β,11β-oxide.

To a solution of 200 mg. of 5α,17α-dimethyl-2α-fluoro-androstane-17β,ol-3-one-9β,11β-oxide in 2 ml. of chloroform and 2 ml. of tetrahydrofuran in a polyethylene bottle at −60° C. is added 2 ml. of 2:1 (by weight) mixture of anhydrous hydrogen fluoride and tetrahydrofuran. After 4 hours at −30° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization gives 5α,17α-dimethyl-2α,9α-difluoro-androstane-11β,17β-diol-3-one.

A solution of 400 mg. of 5α,17α-dimethyl-2α,9α-difluoro-androstane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 5α,17α-dimethyl-2α,9α-difluoro-androstane-17β-ol-3,11-dione.

To a solution of 100 mg. of 5α,17α-dimethyl-2α-fluoro-androstane-17β-ol-3-one-9β,11β-oxide in 4 ml. of chloroform is added 5 ml. of concentrated hydrochloric acid. The two-phase mixture is stirred at 25° C. for 1 hour. Addition of water and chloroform extraction gives a crude product which is hydrolyzed by treatment with potassium bicarbonate in aqueous methanol to give 5α,17α-dimethyl-2α-fluoro-9α-chloro-androstane-11β,17β-diol3-one.

A solution of 5α,17α-dimethyl-2α-fluoro-9α-chloro-androstane-11β,17β-diol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by recrystallization to give 5α,17α-dimethyl-2α-fluoro-9α-chloro-androstane-17β-ol-3,11-dione.

We claim:
1. 5α,17α-dimethyl-2α-fluoro-androstane-17β-ol-3-one.
2. 5α-methyl-1-androstene-17β-ol-3-one.
3. 5α,17α-dimethyl-1-androstene-17β-ol-3-one.
4. 5α-methyl-[3,2-C]pyrazolo-androstane-17β-ol.
5. 5α,17α-dimethyl-2 - hydroxymethylene - androstane-17β-ol-3-one.
6. 5α-methyl-androstane-17β-ol-3,11-dione.
7. 5α,17α-dimethyl-9α-fluoro-androstane-11β,17β - diol-3-one.

8. 2α,5α,17α-trimethyl-9α-fluoro-androstane-11β,17β-diol-3-one.

9. 2α,5α,17α-trimethyl-9α-fluoro-androstane-17β-ol-3,11-dione.

10. 2α-fluoro-5α,17α-dimethyl-9α-fluoro-androstane-11β,17β-diol-3-one.

11. The process which comprises reacting a 3-lower alkoxy-Δ²-dehydro-steroid-6-one belonging to a series selected from a group consisting of the androstane and pregnane series with a methylating agent thereby forming a corresponding 5α-methyl-steroid compound.

References Cited in the file of this patent

UNITED STATES PATENTS 2,845,381 Tindall _____ July 29, 1958
2,908,693 Ringold et al. _____ Oct. 13, 1959

OTHER REFERENCES

Jensen et al.: Journal Amer. Chem. Soc. (1959), vol. 81, pages 5620.

Ringold et al.: Journal Amer. Chem. Soc. (1959), vol. 81, page 427.

Edwards et al.: "Journal Amer. Chem. Soc." (October 5, 1959), vol. 81, pages 5, 262.